Patented June 19, 1945

2,378,815

UNITED STATES PATENT OFFICE 2,378,815

PRODUCTION OF LOW TEMPERATURES

Helen L. Wikoff, Columbus, Ohio

No Drawing. Application January 31, 1944,
Serial No. 520,551

8 Claims. (Cl. 252—70)

The present application is, in part, a continuation of copending application for U. S. Letters Patent, Serial No. 376,549, filed January 29, 1941, now Patent No. 2,342,991, for improvements in the "Production of low temperatures."

As set forth in the above-identified parent application, there is a definite need for many purposes, and more particularly in connection with research work in biological chemistry where many of the recent advances depend upon the use of low temperatures ranging from —20° to —76° C. or less, for a system in which these low temperatures can be obtained without the use of a so-called "cold room," which generally is not available to the average chemist.

The desiderata of such a system are that it should (a) provide an inexpensive method and means for obtaining low temperatures, preferably on an ordinary laboratory table, (b) that the realizable temperatures should remain substantially constant for appreciable time intervals, and (c) that neither health hazards nor fire hazards should be involved in the production of the cold.

As in the aforesaid application, the present invention relates to the production of low temperatures by a system which is essentially characterized by the employment of essentially non-volatile organic solvent substances in admixture with "Dry Ice," i. e. solid carbon dioxide preferably in the form now readily available on the market.

Briefly stated, the invention takes advantage of the fact that there is a specific low temperature magnitude to which each mixture of non-volatile solvent and solid refrigerant ("Dry Ice") goes, and which is maintained essentially constant for a long period of time.

The primary object of the invention, namely, the realization of the aforementioned desiderata, is effectuated as a result of the circumstance that the temperature of the mixture of solvent and refrigerant will not rise until all the solidified material has been converted into liquid.

In short, the means for producing low temperatures according to the invention is, in effect, a saturated solution of carbon dioxide in a substantially non-volatile, normally liquid organic substance in liquid phase, the solution containing a slight excess of carbon dioxide in solid form.

Since carbon dioxide melts at —79.5° C., this represents the minimum temperature attainable according to the invention as above set forth. It being desirable for many purposes, such for example as the carrying out of crystallizations at a temperature in the range from —79.5° C. to —100° C., to obtain temperatures below the aforementioned minimum temperature, a further aspect of the invention relates to the realization of such lower temperatures.

To this end, briefly stated, the constant low-temperature system obtained with the mixture of solvent and "Dry Ice," as above set forth, is evacuated in the manner hereinafter described, whereby constant temperatures as low as —100° C. are realized for a considerable period of time.

The preferred non-volatile organic solvents for the purposes of the invention are shown in the following table, together with the temperature attainable according to the first phase of the invention:

Table 1

| Name of product | Temperature produced, °C. (with solid carbon dioxide) |
|---|---|
| Ethylene glycol | —15 ±1 |
| Dimethoxytetraethylene glycol | —31 ±1 |
| Diethyl carbitol | —52 ±1 |
| Carbitol acetate | —67 ±2 |
| Cellosolve | —73 to —77 |
| Cellosolve acetate | |
| Diacetone alcohol | |
| Butyl cellosolve | |

The aforesaid parent application discloses and claims the first phase of this invention generically and specifically, the specific claims being directed to ethylene glycol, diethyl carbitol, and dimethoxytetraethylene glycol. The present application, on the other hand, is directed to the "cellosolve" compounds as the specific non-volatile organic solvents, these being preferred for the lowermost range of temperatures. Thus these compounds, in association with "Dry Ice" according to the invention, are particularly suitable for maintaining temperatures of —73° to —77° C. over long periods of time.

In actual practice, it has been found more convenient to use a series of graded low-temperature baths than to place a warm object at once into a container with a bath of an extremely low temperature. The latter practice will generally result in the violent evolution of carbon dioxide together with a possible loss of part of the cooling fluid. Such a series of baths can be obtained, for example, by using any of the said "cellosolve" compounds in admixture with a varying amount of "Dry Ice."

The preferred procedure according to the first phase of the invention is illustrated in the following:

ILLUSTRATIVE PROCEDURE I

Low temperatures may be obtained according to this phase of the invention, for example in containers of suitable capacity (e. g. 1000 cc. "Thermos" brand vacuum—insulated containers made of "Pyrex" glass and covered, if desired, with a further insulating layer of cotton or other suitable insulating material, the containers being supported if desired in copper jackets provided with lids and handles) by slowly adding 115–170 grams (4 to 6 ounces) of "Dry Ice," in small pieces, to about 500 cc. of the non-volatile liquid used. The solid carbon dioxide or "Dry Ice" is preferably added slowly to prevent the liquid from being splattered out of the container by too rapid an evolution of $CO_2$. The temperature is thus lowered appreciably within a few minutes and further additions of "Dry Ice" may then be made with little danger of splattering.

It is of course possible to use large containers such as are available on the market in the form, for example, of 4300 cc. and 41,371 cc. capacity, in which case correspondingly greater quantities of non-volatile solvent and solid refrigerant are used. The 4300 cc. capacity container, for example, is large enough to accommodate a 1-liter Erlenmeyer flask, while the larger container will accommodate much larger vessels.

With respect to the second (vacuum) phase of the invention, the preferred products are indicated in the following:

Table 2

| Name of product | Temperature produced, ° C. (with solid carbon dioxide and vacuum) |
| --- | --- |
| Cellosolve | −100° C. or lower |
| Cellosolve acetate | −100° C. or lower |
| Methyl cellosolve acetate | −92° C. or lower |

Other solvents, adapted according to the first phase of the invention for the production of temperatures within the range −73° to −77° C., were however found to be unsuitable for the production of temperatures within the lower range dealt with in this second phase of the invention. Thus, for example, butyl cellosolve and diacetone alcohol were found to be unsuitable in this regard.

The second phase of the invention will be clear from the following:

ILLUSTRATIVE PROCEDURE II

"Thermos" brand vacuum-insulated containers of "Pyrex" brand glass were again used as the cooling baths. The 4300 cc. capacity flask (No. 8642, the American Thermos Bottle Company) with full diameter 16.95 cm. (6.78 inches) openings, and 37.19 cm. (10.875 inches) inside depth, of such size that an Erlenmeyer flask or a beaker having a capacity of one liter could be accommodated was used for most of this work. Smaller containers 1000 cc. capacity (No. 8645) with full diameter 6.88 cm. (2.75 inches) openings and 39.7 cm. (11.875 inches) inside depth could be substituted if test tubes or small bottles were to be chilled.

Low temperatures of the order of −77° C. were obtained in the above fashion by slowly adding solid carbon dioxide to the appropriate non-volatile solvents. At this point a heavy-walled glass bell jar with an opening in the top was placed over the low temperature bath and sealed at the base to the supporting table. For sealing, a mixture of art plastic and stopcock grease mixed to a consistency similar to modeling clay was used. This material formed an air-tight seal when spread around the base of the bell jar and was easily removed with a spatula when it was desired to move the bell jar. Any other suitable sealing means may, however, be used. The top of the bell jar was closed by a one-holed rubber stopper through which a glass tube leading to a vacuum pump was inserted.

After the bell jar had been sealed to the table, the system was cautiously evacuated so that the cooling bath did not spatter out because of too rapid an evolution of carbon dioxide. A Weston dial thermometer (30° C. to −100° C.) facilitated temperature readings. No attempt was made to obtain a vacuum of less than 50 mm. mercury pressure because the resistance of the bell jar glass was not guaranteed.

When the pressure in the system was diminished, the rapid evaporation of carbon dioxide from the cold mixture of solvent and dry ice, chilled the solvent below the initial temperature of −77° C. After the pressure in the system had been reduced to about 50 mm. of mercury, the vacuum pump was turned off and air gradually allowed to return to the closed system. By repeatedly exhausting the bell jar, lower temperatures could be produced.

A mixture of either cellosolve or cellosolve acetate with dry ice subjected to the above treatment produced a temperature of −100° C. after about 30 minutes of reduced pressure treatment. Since the thermometers available did not register lower temperatures, it was impossible to determine how cold the mixture became when the process of alternating the pressure in the system was continued longer. However, it was possible to maintain a temperature of −100° C. in the bath for over 30 minutes after the vacuum was broken and the bell jar moved.

Methyl cellosolve acetate was also subjected to the vacuum treatment. When the temperature reached approximately −98° C., the mixture of dry ice and methyl cellosolve acetate solidified completely and the temperature rose to −92° C. After the vacuum was broken, the bath was allowed to stand uncovered and at room temperature. The temperature of the bath remained constant at −92 C. until most of the solvent had melted (several hours later).

An important feature of the present invention is that the same fluid may be used many times by simply adding "Dry Ice" whenever a low temperature is desired. If convenient, the solvents may be left in the small "Thermos" containers which may be closed by corks after the contents have returned to room temperature. When the solvent must be removed from the container, a violent evolution of carbon dioxide together with a possible loss of part of the fluid may occur if the cold mixture is poured directly into a bottle, beaker, or other container at room temperature, and caution must therefore be exercised in this regard.

The term "Dry Ice," as herein employed, refers to solid carbon dioxide; the name "diethyl carbitol" refers to the diethyl ether of diethylene glycol corresponding to the formula $$(C_2H_5OCH_2CH_2)_2O$$

the name "carbitol acetate" refers to the monoethyl ether of diethylene glycol acetate corresponding to the formula

the name "cellosolve" refers to the monoethyl ether of ethylene glycol corresponding to the formula $C_2H_5OCH_2CH_2OH$; the name "cellosolve acetate" refers to the monoethyl ether of ethylene glycol acetate corresponding to the formula

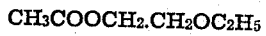

the name "butyl cellosolve" refers to the mono n-butyl ether of ethylene glycol corresponding to the formula $C_4H_9O.CH_2CH_2OH$; and the name "methyl cellosolve acetate" refers to the monomethyl ether of ethylene glycol acetate corresponding to the formula $CH_3COOCH_2.CH_2OCH_3$.

The expression "non-volatile solvent," as herein employed refers to normally liquid substances of the character hereinbefore enumerated and having a vapor pressure of the order of about 4 mm. of mercury and preferably less, at room temperature.

It will be apparent from the foregoing specific disclosure that ways and means of realizing the initially-outlined desiderata are provided by the present invention.

Having disclosed the invention, what is claimed is:

1. A constant low-temperature composition consisting essentially of a solution of carbon dioxide in a substantially non-volatile, normally liquid organic substance selected from the group consisting of the monoethyl ether of ethylene glycol, the monoethyl ether of ethylene glycol acetate, the monomethyl ether of ethylene glycol acetate, and the mono n-butyl ether of ethylene glycol, said solution being saturated with respect to carbon dioxide and containing undissolved solid carbon dioxide therein.

2. A constant low-temperature composition consisting essentially of a solution of carbon dioxide in a substantially non-volatile, normally liquid organic substance, said solution being saturated with respect to carbon dioxide and containing undissolved solid carbon dioxide therein, said liquid organic substance being the monoethyl ether of ethylene glycol.

3. A constant low-temperature composition consisting essentially of a solution of carbon dioxide in a substantially non-volatile, normally liquid organic substance, said solution being saturated with respect to carbon dioxide and containing undissolved solid carbon dioxide therein, said liquid organic substance being the monoethyl ether of ethylene glycol acetate.

4. The method of producing a substantially constant low-temperature medium particularly adapted to maintain a constant low temperature of the order of —73° C. to —92° C. and lower for a considerable period of time, which comprises dissolving solid carbon dioxide in a substantially non-volatile, normally liquid organic substance selected from the group consisting of the monoethyl ether of ethylene glycol, the monoethyl ether of ethylene glycol acetate, and the monomethyl ether of ethylene glycol acetate in liquid phase until an excess of the solid carbon dioxide produces no reduction in temperature after standing for a considerable period of time, and then reducing the ambient pressure to sub-atmospheric.

5. The method of producing a substantially constant low temperature medium particularly adapted to maintain a constant low temperature of the order of —73° C. to —92° C. and lower for a considerable period of time, which comprises dissolving solid carbon dioxide in a substantially non-volatile, normally liquid organic substance selected from the group consisting of the monoethyl ether of ethylene glycol, the monoethyl ether of ethylene glycol acetate, and the monomethyl ether of ethylene glycol acetate in liquid phase, discontinuing the addition of solid carbon dioxide as soon as a slight excess thereof in undissolved form is present, and then alternately diminishing the ambient pressure to sub-atmospheric and restoring the said pressure to atmospheric until the desired low temperature is attained.

6. The method of producing a substantially constant low temperature medium particularly adapted to maintain a constant low temperature of the order of —100° C. and lower for a considerable period of time, which comprises dissolving solid carbon dioxide in a substantially non-volatile, normally liquid organic substance by adding solid carbon dioxide thereto, discontinuing the addition of solid carbon dioxide as soon as a slight excess thereof in undissolved form is present, and then alternately diminishing the ambient pressure to sub-atmospheric and restoring the said pressure to atmospheric until the desired low temperature is attained, said normally liquid organic substance being the monoethyl ether of ethylene glycol.

7. The method of producing a substantially constant low temperature medium particularly adapted to maintain a constant low temperature of the order of —100° C. and lower for a considerable period of time, which comprises dissolving solid carbon dioxide in a substantially non-volatile, normally liquid organic substance by adding solid carbon dioxide thereto, discontinuing the addition of solid carbon dioxide as soon as a slight excess thereof in undissolved form is present, and then alternately diminishing the ambient pressure to sub-atmospheric and restoring the said pressure to atmospheric until the desired low temperature is attained, said normally liquid organic substance being the monoethyl ether of ethylene glycol acetate.

8. The method of producing a substantially constant low temperature medium particularly adapted to maintain a constant low temperature of the order of about —92° C. for a considerable period of time, which comprises dissolving solid carbon dioxide in a substantially non-volatile, normally liquid organic substance by adding solid carbon dioxide thereto, discontinuing the addition of solid carbon dioxide as soon as a slight excess thereof in undissolved form is present, and then alternately diminishing the ambient pressure to sub-atmospheric and restoring the said pressure to atmospheric until the desired low temperature is attained, said normally liquid organic substance being the monomethyl ether of ethylene glycol acetate.

HELEN L. WIKOFF.